Feb. 15, 1927. 1,617,919
M. MADSEN
APPARATUS FOR SIZING PAVING MATERIAL
Filed April 30, 1925
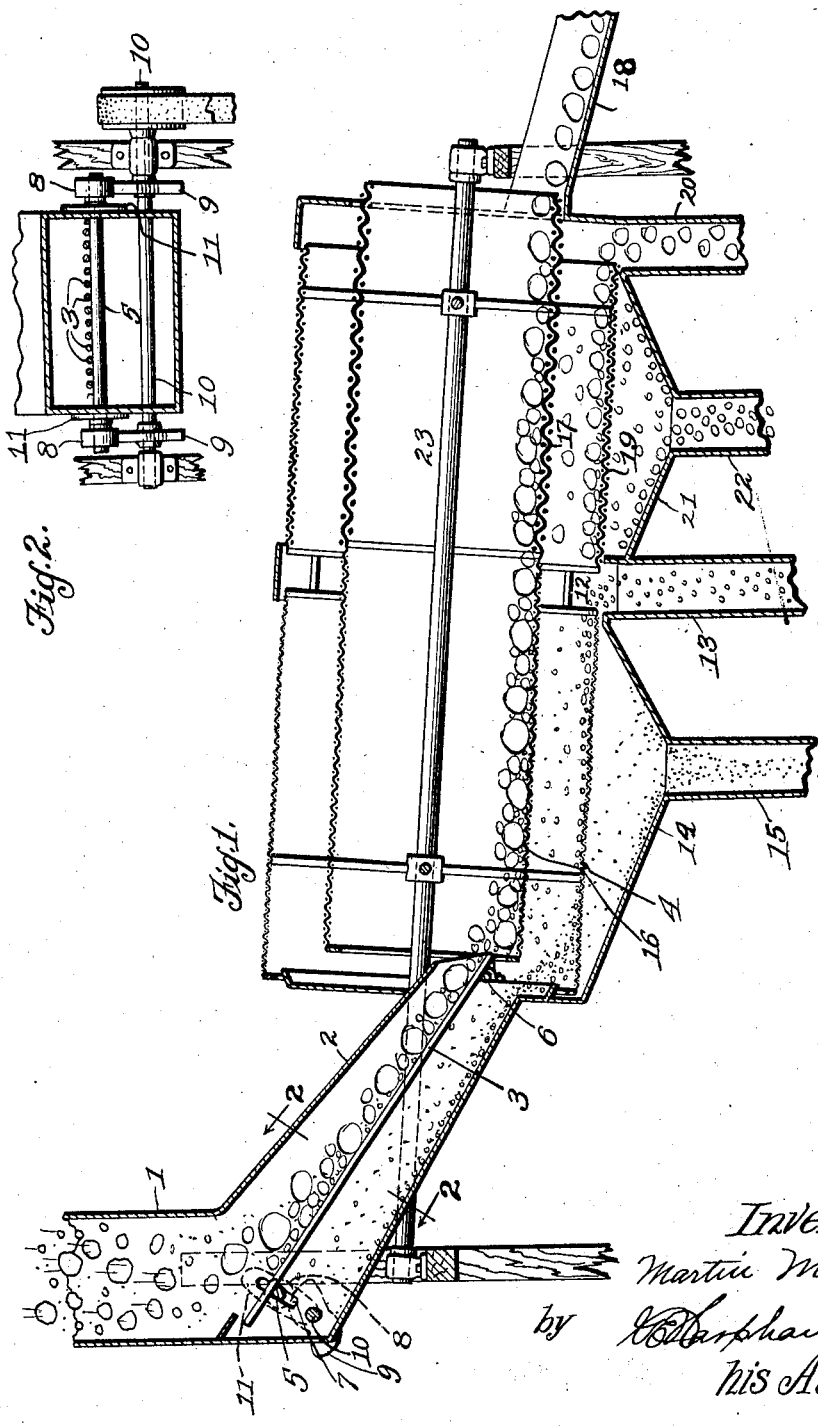
Inventor;
Martin Madsen
by
his Attorney.

Patented Feb. 15, 1927.

1,617,919

UNITED STATES PATENT OFFICE.

MARTIN MADSEN, OF MONTEREY PARK, CALIFORNIA.

APPARATUS FOR SIZING PAVING MATERIAL.

Application filed April 30, 1925. Serial No. 26,934.

In sizing paving material it is customary to thoroughly dry the bulk material by artificial heat and after the material is dry to run the same through sorting or sizing screens whereby the material is separated into different sizes. Usually there are four grades consisting of very fine, fine, coarse and very coarse and these grades as they come from the dryer are in a common or bulk mass. This bulk mass is usually discharged from the dryer into a revolving screen consisting of a plurality of concentric screens of different mesh. There is usually in the bulk mass a percentage of gross material too large for paving purposes which must be separated out. The inner screen carries this useless material out at the end thereof. The good material passes through No. 1 the inner screen and is caught by screen No. 2 which retains the very coarse material and carries it out at the end thereof, the coarse and fine and very fine material passing through to screen No. 3 which retains the coarse material and carries it out at the end thereof. The fine and very fine material pass through No. 3 to screen No. 4 which retains the fine material and carries it out at the end thereof. The very fine material passes through No. 4 and is collected in a trough below the same. The fine material is carried out at the end of No. 4. As these screens revolve slowly and are set at a slight angle it will be seen that in order to effect a proper separation of the different sizes that the screens must be of considerable diameter and length.

It is the object of my invention to produce a sizing apparatus for paving material which will reduce both the diameter and length of the sizing screens and which will do the sizing in less time and more perfectly than is now being done with the apparatus in common use for that purpose.

In the drawings forming a part of this application Fig. 1 is a longitudinal central vertical section of my improved sizing machine. Fig. 2 is a section on the line 2—2 of Fig. 1.

Referring to the drawings, 1 is a hopper into which the bulk material is fed from the drying machine, not shown. The material slides down chute 2 into the sizing screens. In chute 2 and extending across hopper 1 is what I term a grizzly, which consists of parallel rods 3 spaced apart to permit the fine and very fine material to pass therebetween and fall upon the bottom of the chute down which they slide and enter screen 4. Rods 3 near the ends thereof are secured to transverse bars 5 and 6. Bar 5 extends through vertical slots 7 in the walls of the hopper and has rollers 8 revolubly mounted on the ends thereof. These rollers are engaged by cams 9 mounted on shaft 10 and as the shaft is revolved by any suitable means, not shown, raise that end of the grizzly and let it drop thereby increasing its separating effect. Bar 6 is rockably mounted in the walls of the hopper. Slots 7 are covered by plates 11 that rise and fall with bar 5. The rollers and cams can be omitted, but their use causes the grizzly to separate the material faster. Screen 4 is of a mesh that permits the very fine material to pass through the mesh while the fine material passes thereover and is delivered into runway 12 from which it passes into spout 13 and thence to an appropriate bin, not shown. The very fine material falls upon runway 14 from which it passes into spout 15 and thence to an appropriate bin, not shown. The coarse, very coarse and gross material slide off the grizzly into screen 16 through which they pass into screen 17. The mesh of screen 16 is of such mesh that any fine or very fine material will pass through the screen and fall into screen 4. Screen 17 is of such mesh that the coarse and very coarse material will pass through the mesh but the gross material will be carried out at the end thereof into spout 18. The coarse and very coarse material pass through the mesh of screen 17 and fall upon screen 19 and the coarse material passes through the mesh of 19 and the very coarse material passes out at the end of 19 into spout 20 and thence to an appropriate bin, not shown. The coarse material drops upon runway 21 and thence into spout 22 and thence to an appropriate bin, not shown. Shaft 23 on which the screens are mounted may be rotated by appropriate means.

By this construction it will be seen that I make an initial separation by the grizzly of the material into two parts, one of which contains only the very fine and fine material. The other material passes through a screen that permits any very fine and fine material that may have passed the grizzly to be separated therefrom, and thence to another screen that screens out the gross material and permits the coarse and very coarse material to pass to another screen which separates these two materials. As no single screen is required to separate more than two grades, I can make the screens of less diameter and shorter than if all the material must first pass through a single screen to screen out the very fine material and then on to successive screens where the successive grades of material are screened out. Another advantage of this construction is that I have found in practice a more perfect separation of the material into the desired grades is effected than where the material passes through successive screens, the first of which screens out the very fine, the next the fine, the next the coarse, the next the very coarse and the last the gross material. If desired more than one grizzly can be used in chute 2 but I have found that a single one produces very good results.

Having described my invention I claim—

1. In an apparatus for sizing paving material, in combination, a plane sifter and a plurality of nested drum sifters, the plane sifter being longitudinally alined with the drum sifters and having an oversize delivery directly to the inner drum sifter and a chute delivering directly to the outer drum sifter, the inner drum sifter being adapted to deliver its undersize to the outer drum, each drum sifter being of different mesh at each end thereof and the outer members finer than the inner ones; and means to rotate said drum sifters.

2. In an apparatus for sizing paving material, in combination, a frame; two nested revoluble concentric screen sifters mounted in said frame, said screen sifters being of varying mesh, the outer being of finer mesh than the inner and the inner end of each being of finer mesh than the outer end thereof; a chute mounted in said frame having a longitudinal sifter therein adapted to deliver the larger size material into the inner screen sifter and the chute delivering the smaller size material into the inner end of the outer screen sifter; and means to rotate said screen sifters.

In witness that I claim the foregoing I have hereunto subscribed my name this 21st day of April, 1925.

MARTIN MADSEN.